United States Patent [19]

Yasuda et al.

[11] Patent Number: 4,849,828
[45] Date of Patent: Jul. 18, 1989

[54] SEARCH SYSTEM AND SPECIAL REPRODUCTION SYSTEM FOR INFORMATION REPRODUCTION DEVICE

[75] Inventors: Shigeru Yasuda; Kenichiro Yasukawa, both of Saitama, Japan

[73] Assignee: Pioneer Electronic Corporation, Tokyo, Japan

[21] Appl. No.: 88,333

[22] Filed: Aug. 24, 1987

[30] Foreign Application Priority Data

| Aug. 22, 1986 | [JP] | Japan | 61-197618 |
| Aug. 22, 1986 | [JP] | Japan | 61-197619 |
| Aug. 22, 1986 | [JP] | Japan | 61-197620 |
| Aug. 29, 1986 | [JP] | Japan | 61-203243 |

[51] Int. Cl.⁴ ............................................. H04N 5/76
[52] U.S. Cl. ..................... 358/342; 358/343
[58] Field of Search ......................... 358/341–343; 36 D/14.1, 14.3, 33.1, 19.1, 10.1

[56] References Cited

U.S. PATENT DOCUMENTS

| 4,602,295 | 7/1986 | Moriyama et al. | 358/343 |
| 4,675,751 | 6/1987 | Yagi et al. | 358/342 X |

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

The invention relates to improvements in video reproduction techniques, particularly with respect to video disk recordings. The disclosed apparatus has the capability of storing video in a video memory for subsequent single or repeated playback. Video memory readout may be used to mask a search function, or may accompany the audio playback from the same or a different disk. A strobe-readout technique is also disclosed wherein the video memory is rewritten at user defined intervals which are typically small multiples of the video field or frame rate.

11 Claims, 5 Drawing Sheets

SEARCH SYSTEM AND SPECIAL REPRODUCTION SYSTEM FOR INFORMATION REPRODUCTION DEVICE

BACKGROUND OF THE INVENTION

The present invention relates to a search system and special reproduction mode system for an information reproduction device, and particularly to a search system, a stroboscopic motion reproduction system, a still picture reproduction system and a still picture and sound reproduction system for an information reproduction device having a video memory.

There are known in the art two types of video disks, e.g., the constant-angular-velocity (hereinafter abbreviated as CAV) recording disk and the constant-line-velocity (hereinafter abbreviated as CLV) recording disk.

With the CAV disk, a fixed amount of information such as the quantity of video information for a frame is recorded on a track in each radial position of the disk. Disk portions, on each of which information corresponding to a vertical synchronizing signal located on the boundary between frames is recorded, are located in a straight line extending in the radial direction of the disk. As a result, the period of the synchronizing signal of a reproduced video signal is not disturbed immediately after a jump over the CAV disk, so that a reproduction mode such as the reproduction of a still picture may be properly performed.

With the CLV disk, however, the quantity of information recorded in the arcuate track at one radial position on the disk differs from that of the information recorded on the track at another radial position thereon. For example, the video information for one frame is recorded in the innermost circular track, while video information for three frames is recorded in the outermost track. As a result, the period of the synchronizing signal of a video signal obtained immediately after a jump over the disk is disturbed. For this reason, an information reproduction device including a video memory capable of storing the video signals for a frame or field is herein proposed. In this system, a reproduced video signal is converted into a digital signal through the use of a clock signal synchronized with the reproduced video signal, the digital signal is written into a prescribed position in the video memory, and the written digital signal is read therefrom through the use of an external stable clock signal. In this information reproduction device, portions, each of which corresponds to a frame or a field, can be extracted, at a desired period, from video information obtained from a recording disk and are then sequentially written into the video memory so that stroboscopic motion reproduction (scene extraction reproduction) can be performed. The interval of scene extraction for stroboscopic motion reproduction is not necessarily so definite that the interval can be easily determined by sight, and thus an indicator is provided therefor.

SUMMARY OF THE INVENTION

It is an object of the present invention to provide a search system in which the user of an information reproduction device having a video memory can obtain a consistent image even in the search operation of the device. The search system is characterized in that the amount of information for at least one field is read from a recorded disk and written into the video memory in response to a search command; the search for an address designated by the search command is thereafter started; and the information written into the video memory is repeatedly read therefrom and sent out as reproduced information during the search operation.

It is another object of the present invention to provide a stroboscopic motion reproduction system in which the interval of scene extraction for stroboscopic motion reproduction can be clearly indicated. The stroboscopic motion reproduction system is characterized in that the reading of recorded information from a disk is started in response to a stroboscopic motion command; the video information for at least one field is selected, at an appointed period or interval, from the information read from the disk and is sequentially written into the video memory; and the video information written into the video memory is repeatedly read therefrom and sent out as reproduced video information with an indicator which is turned on and off synchronously with the writing of the video information into the video memory.

It is still another object of the present invention to provide a still picture reproduction system in which one recording disk can be exchanged for another even during the reproduction of a still picture, and audio information recorded on the other disk can be reproduced at the same time as the reproduction of the still picture after the change. The still picture reproduction system is characterized in that video information for at least one field is read from the disk by reading recorded information from the disk in response to a still picture reproduction command and is written into the video memory; a memory information reading operation of repeatedly reading stored information from the video memory and sending out the read information as still picture information is performed; and only the disk reading operation is stopped or started in response to a disk takeout command and a disk reading operation start command, respectively, while the memory information reading operation remains continuously performed.

It is still another object of the present invention to provide a still picture and sound reproduction system in which audio information can be reproduced during the reproduction of a still picture. The system is characterized in that video information for at least one field is read from a disk and written into the video memory in response to a still picture reproduction command; the video information written into the video memory is repeatedly read therefrom and sent out as reproduced video information; information recorded at positions on the recording disk beyond the position of the recording of the video information which is written into the video memory is sequentially read from the disk; and audio information in the sequentially read information is sent out as the reproduced audio information.

DETAILED DESCRIPTION OF THE EXEMPLARY EMBODIMENTS

Embodiments of the present invention are hereafter described in detail with reference to the drawings attached hereto.

Figure 1:
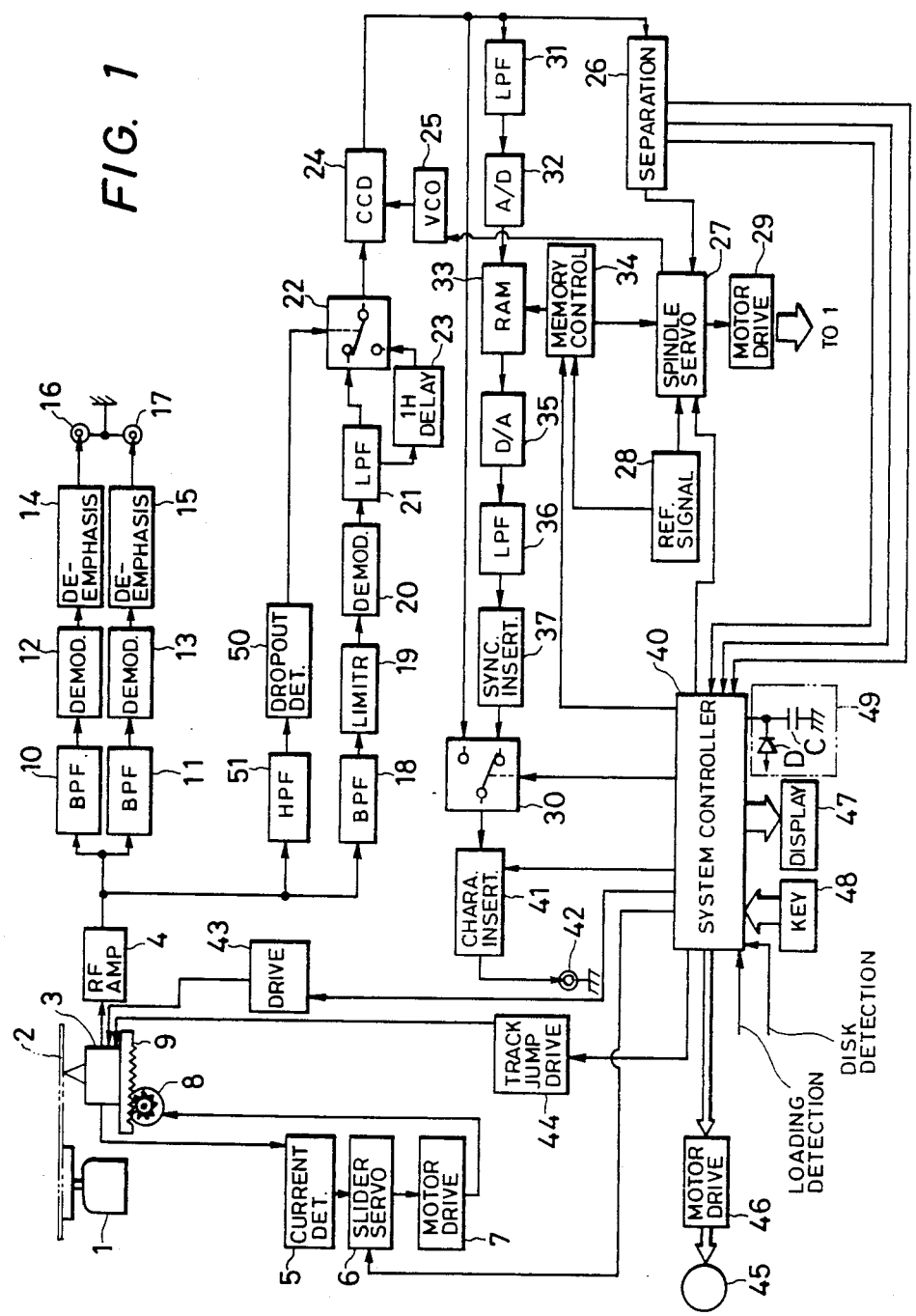
FIG. 1 shows a block diagram of an information reader employing a system provided in accordance with the present invention.

The first embodiment, i.e., aspect of the invention, which is a search system for an information reproduction device, will now be described, following a description of the hardware of the invention. As shown in FIG. 1, information recorded on a disk 2 rotated by a spindle motor 1 is read from the disk by an optical pickup 3 in which a laser diode, an objective lens, a focusing actuator, a tracking actuator, a photosensor and so forth are provided. The output from the pickup 3 is supplied to an RF amplifier 4 and is also supplied to a focusing servo circuit and a tracking servo circuit which are not shown in the drawings. The focusing actuator and the tracking actuator in the pickup 3 are driven by the focusing servo circuit and the tracking servo circuit so that the position of the information detecting laser light spot converged onto the recording surface of the disk 2 is controlled in the radial direction of the disk. The light spot is thus positioned in a track of the recorded surface of the disk 2.

An electrical current supplied to a coil for driving the tracking actuator in the pickup 3 is applied to a current detection circuit 5 which sends out a current detection signal corresponding to the electrical current and supplies the signal to a slider servo circuit 6 which performs the amplification and phase compensation of the signal. The output from the slider servo circuit 6 is supplied to a motor drive circuit 7 which converts the output into a drive signal for a slider motor 8 which drives a slider 9 bearing the pickup 3 in the radial direction of the disk 2, so that the tracking actuator in the pickup 3 is positioned at the middle point of its range of mobility.

An RF signal sent out from the RF amplifier 4 is supplied to band-pass filters 10 and 11 so that audio FM signals for right and left channels are extracted. The audio FM signals for both channels are supplied to FM demodulators 12 and 13 so that audio signals for both channels are reproduced. The reproduced audio signals for both channels are supplied to de-emphasis circuits 14 and 15 so that components emphasized at the time of recording are returned to original levels. The audio signals sent out from the de-emphasis circuits 14 and 15 are supplied to audio output terminals 16 and 17.

The RF signal sent out from the RF amplifier 4 is also supplied to a band-pass filter 18 so that a video FM signal is extracted. After the amplitude of the video FM signal is limited by a limiter 19, the signal is supplied to an FM demodulator 20 so that a video signal is reproduced. The video signal is supplied to one input terminal of a dropout compensation switch 22 through a low-pass filter 21. The video signal delayed by a 1H-delay line 23 (1H denotes one horizontal synchronization period) is supplied to the other input terminal of the switch 22 to which a dropout detection signal sent out from a dropout detection circuit 50 is supplied as a control signal. The high-frequency component of the RF signal, which is extracted by a high-pass filter 51, is supplied to the dropout detection circuit 50 which detects dropout in terms of the zero-crossing point of the high-frequency component of the RF signal, for example, and generates a dropout detection signal accordingly. The signal changeover action of the switch 22 is controlled by the dropout detection signal so that when dropout has occurred, the video signal sent out from the 1H-delay line 23 and corresponding to the video signal one horizontal synchronization period ago is selectively sent out from the switch 22 to compensate for the dropout.

The video signal sent out from the switch 22 is supplied to a charge coupled device 24 to which a clock signal sent out from a voltage-controlled oscillator 25 is also supplied. In the charge coupled device 24, the video signal is delayed by a time corresponding to the frequency of the clock signal. The video signal sent out from the charge coupled device 24 is supplied to a separation circuit 26 which separates horizontal and vertical synchronizing signals and control data such as the Philips code from the video signal. The horizontal synchronizing signal sent out from the separation circuit 26 is supplied to a spindle servo circuit 27 in which the phase of the horizontal synchronizing signal and that of a reference signal supplied from a reference signal generation circuit 28 and having a prescribed frequency are compared with each other. A spindle error signal corresponding to the difference between the phases of the signals so compared is generated. The spindle error signal is supplied to a motor drive circuit 29 to control the speed of the spindle motor 1. At the same time, a control signal corresponding to the difference between the phases of the horizontal synchronizing signal and the reference signal is generated and supplied to the control input terminal of the voltage-controlled oscillator 25 to cause the oscillation frequency thereof to correspond to the difference between the phases of the horizontal synchronizing signal and the reference signal. As a result, the signal delay time in the charge coupled device 24 is changed depending on the difference between the phases of the horizontal synchronizing signal and the reference signal, to eliminate a time axis error.

The video signal absent any time axis error is supplied to one input terminal of a switch 30 and is also supplied to an A/D converter 32 through a low-pass filter 31. In the A/D converter 32, the video signal is sampled at a prescribed period, and the sampled values thereof are sequentially converted into digital data. The digital data from the A/D converter 32 is supplied to a RAM 33 used as a video memory.

A memory control circuit 34 performs address control and mode control of the RAM 33 so that data written in addresses in the RAM are sequentially read therefrom in accordance with a clock signal supplied from the reference signal generation circuit 28, and so that the contents of the RAM are rewritten in response to a write enable signal.

The data read from the RAM 33 is supplied to a D/A converter 35 and changed into an analog signal. The analog signal from the D/A converter 35 is supplied to a synchronizing signal insertion circuit 37 through a low-pass filter 36 so that synchronizing signals are added to the analog signal to reproduce the video signal. The video signal from the synchronizing signal insertion circuit 37 is supplied to the other input terminal of the switch 30, which is also supplied with a switching control signal from a system controller 40.

Either the video signal sent from the switch 30 through the RAM 33 or the video signal sent from the charge coupled device 24 to the switch 30 is selectively supplied to a character insertion circuit 41, which selectively functions so that a video signal corresponding to a character indicated by data sent from the system controller 40 is synchronized with the video signal supplied from the switch 30. The video signal sent out from the character insertion circuit 41 is supplied to a video output terminal 42.

The system controller 40 is made of a microcomputer comprising a processor, a ROM, a RAM and so forth, and receives the synchronizing signals and the control data from the separation circuit 26, data corresponding to the manipulation of operation keys 48, a loading detection signal from a loading mechanism, a disk detection signal and so forth. In the system controller 40, the processor processes received signals in accordance with a program previously stored in the ROM, to control various sections such as the slider servo circuit 6, the spindle servo circuit 27, the switch 30, the memory control circuit 34, the character insertion circuit 41, a drive circuit 43 for driving the laser diode, a track jump drive circuit 44 for driving the tracking actuator in response to a jump command, a motor drive circuit 46 for driving the motor 45 of the disk loading mechanism, and a display circuit 47. Electric power $V_{CC}$ is applied to the power terminal of the system controller 40 through a diode D. A capacitor C is connected between the power terminal of the system controller 40 and the ground. The diode D and the capacitor C constitute a backup circuit 49 to apply electricity to the system controller 40 even if the electric power $V_{CC}$ is suspended.

Figure 2A:
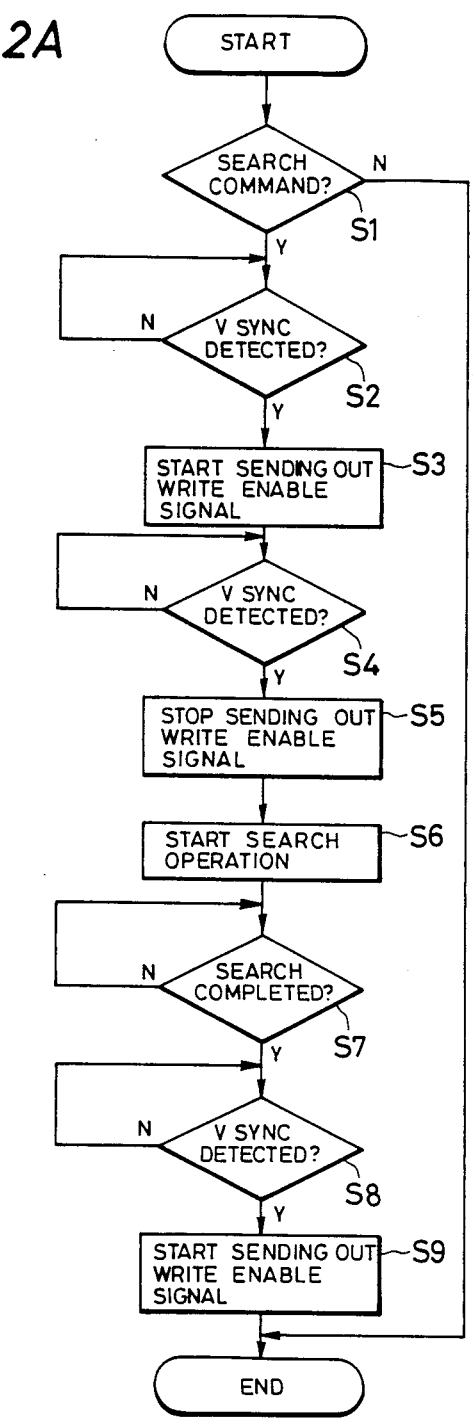
FIGS. 2A, 2B, 2C and 2D show flow charts of the operation of the information reader.

The operation of the processor of the system controller 40 is now described with reference to a flow chart in FIG. 2A. When the keys 48 are manipulated by the user of the information reproduction device during the execution of a main signal reproduction routine or a subroutine, the processor proceeds to a step S1 to judge whether or not an address search command is applied. When it is judged in step S1 that no address search command is applied, the processor resumes execution of the routine being executed immediately before step S1. When it is judged in step S1 that the address search command is applied, the processor proceeds to step S2 to judge whether or not the vertical synchronizing signal is sent out from the separation circuit 26. When it is judged in step S2 that the vertical synchronizing signal is not being sent out from the separation circuit 26, the processor repeats step S2. When it is judged in step S2 that the vertical synchronizing signal has been sent out from the separation circuit 26, the processor proceeds to step S3 to start sending out the write enable signal.

After this, the processor proceeds to step S4 to again judge whether or not the vertical synchronizing signal is being sent out from the separation circuit 26. When it is judged in step S4 that the vertical synchronizing signal is not being sent out from the separation circuit 26, the processor repeats the step S4. When it is judged in step S4 that the vertical synchronizing signal is being output from the separation circuit 26, the processor proceeds to step S5 to cease sending out the write enable signal. The processor then proceeds to step S6 to start the search operation of moving the information detecting light spot of the pickup 3 to an address designated by the search command. Meanwhile, the video memory, load via the preceeding steps, is repeatedly read out to the display monitor. The processor then proceeds to step S7 to judge whether or not the search operation has been completed and the information detecting light spot has been moved to the appointed address. If it is judged in step S7 that the search operation is not complete, the processor repeats steps S7. When it is judged in step S7 that the search operation has been completed, the processor proceeds to a step S8 to judge whether or not the vertical synchronizing signal is being output from the separation circuit 26. If not, the processor repeats step S8. When the vertical synchronizing signal is output from the separation circuit 26, the processor proceeds to step S9 to start sending out the write enable signal to resume execution of the routine being executed immediately before step S1.

Through the above-described operation, video signals corresponding to a field are read from the disk 2 and written into the RAM 33 immediately before the start of the search operation, and the video signals written into the RAM 33 are read therefrom and sent out as reproduced video signals during the search operation.

Although those video signals which correspond to a field are read from the disk and written into the RAM 33 immediately before the start of the search operation in the above-described embodiment, video signals which correspond to at least one frame and which may be reproduced as a still picture may be written into the RAM 33 before the start of the search operation and read from the RAM and sent out during the search operation.

If video signals corresponding to a plurality of frames are written into the RAM 33, the video signals for one of the frames may be selectively read from the RAM by the manipulation of the keys 48.

The above-described feature of the invention produces an effect such that video information obtained from the disk immediately before the search operation can be reproduced during the search operation to generate a consistent image for the user.

Figure 2B:
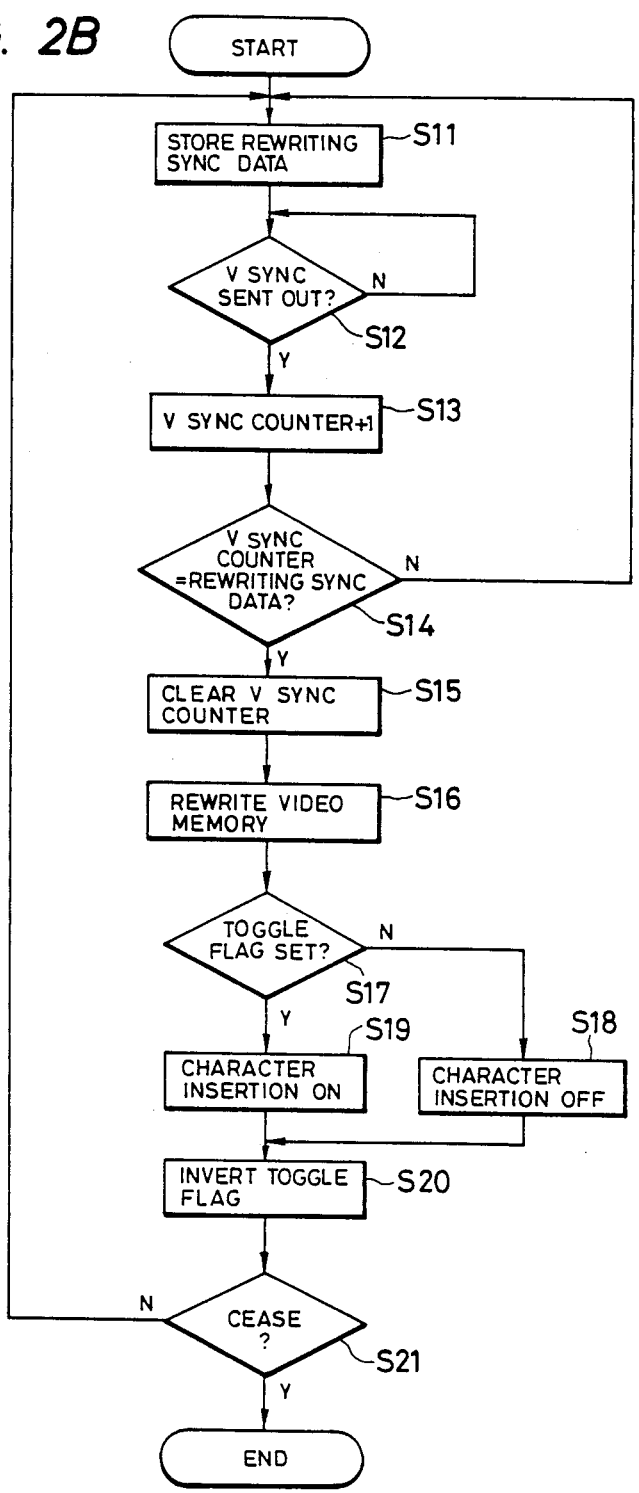

The second feature of the invention, a stroboscopic motion reproduction system for the information reproduction device, will now be described with reference to the flow chart of FIG. 2B. When the user of the device commands stroboscopic motion reproduction by manipulating the keys 48 during the execution of the main routine, the system processor proceeds to step S11 where a memory rewriting period or interval data entered at the same time as the command are written into a prescribed address in the RAM of system controller 40. The processor then proceeds to step S12 to judge whether or not a vertical synch signal is sent out from separation circuit 26; if not, the processor repeats step S12. When the vertical synch signal is sent out from the separation circuit 26, the processor proceeds to step S13 to add 1 to the content of an address which is in the RAM of the system controller 40 and which is used as a vertical synchronization counter.

The processor next proceeds to step S14 to judge whether or not the count of the vertical synchronization counter is coincident with the rewriting interval data. When the count is not coincident with the rewriting period data, the processor repeats steps S11, S12, S13 and S14. When the count is coincident with the rewriting period data, the processor proceeds to step S15 to reset the count.

The processor then proceeds to step S16 to send out the write enable signal until the detection of the vertical synchronizing signal from the separation circuit 26, to write the video data for a field into RAM 33. The processor then proceeds to step S17 to judge whether or not a toggle flag is set by toggle flag data stored in a prescribed address in the RAM of the system controller 40. When it is judged in step S17 that the toggle flag is not set, the processor proceeds to step S18 to erase the indication of the rewriting period (this can be seen in FIG. 3). When it is judged in step S17 that the toggle flag is set, the processor proceeds to step S19 to insert a character or the like indicating the rewriting period, into the reproduced picture, to notify the user that stroboscopic motion reproduction is being performed.

The processor subsequently proceeds to step S20 to invert the toggle flag. In step S21, the processor judges whether or not a command for ceasing stroboscopic motion reproduction has been applied. When no command is applied, the processor repeats step S11 and the following steps. When it is judged in step S21 that the cease command has been applied, the processor resumes the execution of the main routine.

Figure 3A:
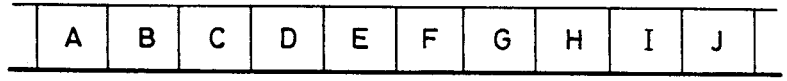
FIGS. 3A and 3B show the information read from a disk in the information reader and the information sent out as reproduced information, in the stroboscopic mode.
Figure 3B:
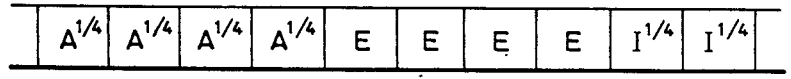

Through the above-described operation, information in frames A, B, C, D, E, F, G, H, I and J, etc. shown in FIG. 3A is sequentially read from the disk. If the rewriting interval is four times as long as the period of one frame, only the information in each of the frames A, E and I is reproduced, each four times. In the image of the frames A and I, "¼" is displayed as a character indicating the rewriting period. The display and erasure of the rewriting period indicator are performed synchronously with the rewriting period to notify the user that stroboscopic motion reproduction is being carried out.

Although in the foregoing an image such as the character "¼" is inserted into the corner of the reproduced picture to inform the user that stroboscopic reproduction is being carried out, other means such as the lighting of an indicator light element, sound generation, or changing the hue of the picture may be used to indicate that stroboscopic motion reproduction is being carried out.

This aspect of the invention produces an effect such that a notification which changes synchronously with the motion of the reproduced picture is performed to clearly indicate the interval of scene extraction.

Figure 2C:
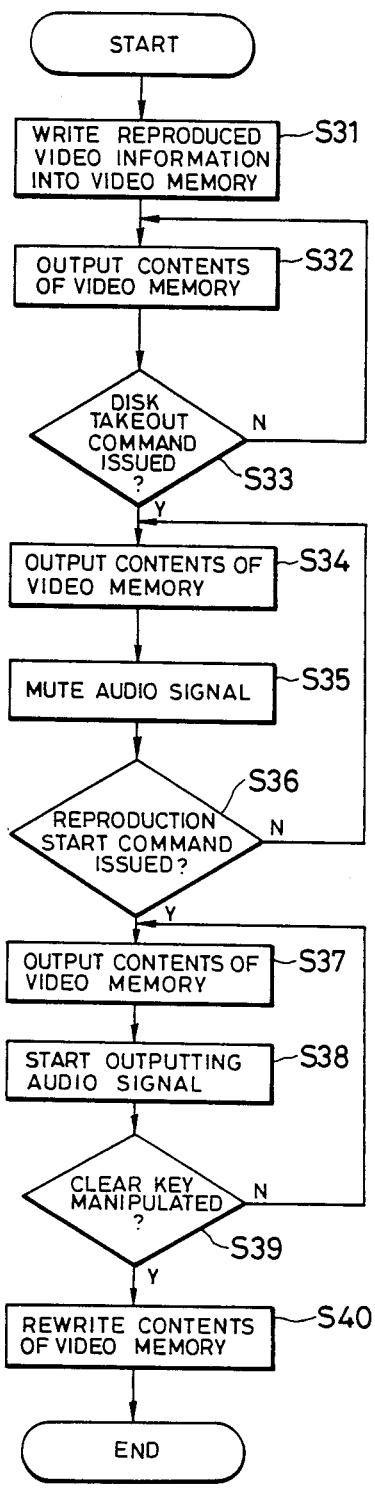

A third feature of the invention, a still picture reproduction system for an information reproduction device, will now be described with reference to the flow chart of FIG. 2C. When a still picture reproduction command is applied by the manipulation of a still picture reproduction key or the like during a playback operation performed by the execution of a main routine or a subroutine for controlling playback, the processor proceeds to step S31 wherein a write enable signal w is output with the timing of the vertical synchronizing signal v from separation circuit 26, so that video signals corresponding to a field are obtained from the disk 2 and written into RAM 33. The processor then proceeds to step S32 to control the changeover action of a switch 30 so that the video signal passes through the RAM 33 is selectively sent out from the switch to the video output terminal 42. The processor then proceeds to step S33 to determine whether or not a disk takeout command for unloading the disk 2 has been applied. If not the processor repeats step S33. When it is judged in step S33 that the disk takeout command is applied, the processor proceeds to step S34 to control the changeover action of the switch 30 to maintain the state in which the video signal passed through the RAM 33 is selectively sent out to the video output terminal 42. The processor then proceeds to a step S35 to apply a muting command to muting circuits to prevent a reproduced audio signal from being sent out to audio output terminals 16 and 17.

The processor then proceeds to step S36 to judge whether or not a disk 2 has been loaded and a reproduction start command applied. If not, the processor repeats step S34. When it is judged in step S36 that the reproduction start command is applied, the processor proceeds to step S37 to control the changeover action of the switch 30 to maintain the state wherein the video signal passed through the RAM 33 is output to terminal 42. The processor then proceeds to step S38 to discontinue application of the muting command to the muting circuits, to send out the reproduced audio signal to the audio output terminals 16, 17. The audio signal read from the newly loaded disk is thus sent out.

The processor proceeds to a step S39 to wait for the operation of a clear key. When it is judged in step S39 that the clear key has been manipulated, the processor proceeds to step S40 to send out the write enable signal w timed to the vertical synchronizing signal from the separation circuit 26, to rewrite the stored contents of the RAM 33 with video signals corresponding to a field and obtained from the disk 2, and to resume execution of the routine being executed immediately before step S31. Video information recorded on the newly loaded disk is reproduced through step S40.

In the above-described operation, even if the disk is unloaded so as to make it impossible to obtain information therefrom, a reproduced picture can be obtained because a frame of video signals is written into the RAM 33 prior to unloading and sent out to the video output terminal. When the reproduction start command is applied after the loading of the new disk, the reading of recorded video information and audio information from the new disk is started. However, since the video signal written in the RAM 33 is selectively sent out to the output terminal 42 due to the action of the switch 30, the video information read from the new disk is not sent out and only the audio information read therefrom is output. At that time, if the clear key is manipulated, the video information read from the new disk is written into the RAM 33, read therefrom and sent out to the video output terminal so that the video information obtained from the new disk may be reproduced.

Although the described embodiment is designed for use with an information reproduction device capable of reproducing information recorded on a video disk only, the present invention is not confined thereto but may be applied to an information reproduction device capable of reproducing both information recorded on a video disk and information recorded on a digital audio disk. In such an application, music can be reproduced from the digital audio disk while a desired still picture is reproduced.

The foregoing embodiment allows one disk to be exchanged for another even during the reproduction of a still picture, and audio information can be reproduced from the new disk simultaneously with the reproduction of the still picture, after the change.

As reading of the disk is stopped by applying the disk takeout command after the application of the still picture reproduction command, a still picture can be reproduced from video information written in the video memory (RAM 33) without wear and tear on the motor, actuators and so forth. At the same time, since the motor, the actuators and so forth remain inactive, the consumption of electric power is decreased and the disk is unlikely to be damaged or the like. Since the still picture can be reproduced even if the disk is unloaded, the disk can be preserved.

Figure 2D:
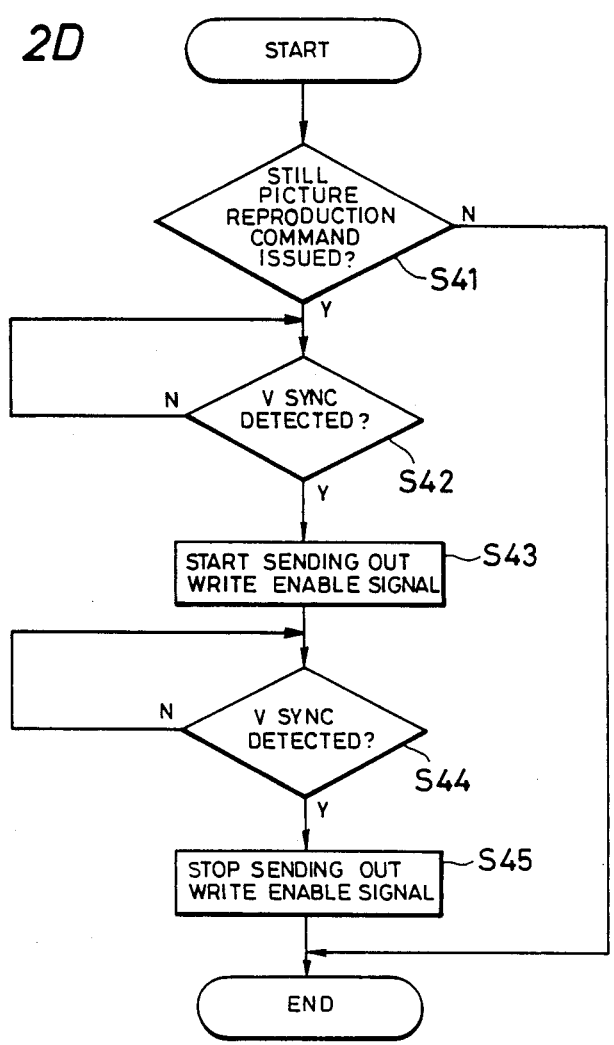

A fourth feature of the invention, a still picture and sound reproduction system for an information reproduction device, will now be described with reference to the flow chart of FIG. 2D. When the user of the device has manipulated keys during a playback operation performed via the execution of a main routine or subroutine for controlling the playback operation, the processor proceeds to step S41 to determine whether or not a still picture reproduction command is applied. If not, the processor resumes execution of the prior routine. If the still picture reproduction command is applied, the processor proceeds to step S42 to check for the vertical synchronizing signal from separation circuit 26. When the vertical synchronizing signal is output from separation circuit 26, the processor proceeds to step S43 to send a write enable signal.

Meanwhile, in step S44 the processor awaits the next vertical synchronizing signal from the separation circuit 26. When the vertical synch signal is sent out from the separation circuit 26, the processor proceeds to a step S45 and stops sending out the write enable signal. Playback of the disk continues so that the audio portion is reproduced while the still video image thus memorized is displayed. Upon actuation of a clear key or the like, the playback system will resume the execution of the routine being executed immediately before step S41.

Through the above-described operation, video signals corresponding to a field are read from the disk and written into a RAM 33 and repeatedly read therefrom so that a still picture is reproduced. At the same time, since the playback operation is continued, sound is reproduced from audio information read from the disk.

The fourth feature produces the effect that audio information can be reproduced during the reproduction of a still picture from the same disk. With this arrangement, a still picture can be reproduced from a disk on which, e.g., fine art video and background music and discussion are recorded.

What is claimed is:

1. A search system for an information reproduction device having a video memory for storing video information obtained from a video source, comprising: means for writing video information for at least one field from said video source into said video memory in response to a search command; means for thereafter conducting a search operation to search for an address designated by said search command; and means for repeatedly reading out said video information written into said video memory during said search operation.

2. A system as claimed in claim 1, wherein said video source comprises a disk having video information recorded thereon.

3. A system as claimed in claim 1, further comprising means for detecting a vertical synch signal in said video source video information in response to said search command, and means for enabling writing into said video memory in response to said means for detecting.

4. A stroboscopic motion reproduction system for a video information reproduction device having a video memory for storing video information obtained from a video source, comprising: means operation in response to a stroboscopic motion command to set a memory rewrite interval, means for writing at least one field of video information into said video memory, means for reading out said video memory to a video output, and means for rewriting said video memory at an interval corresponding to said memory rewrite interval.

5. A system as claimed in claim 4, further comprising means for modifying the video information read out of said video memory to add information for indicating said memory rewrite interval.

6. A system as claimed in claim 5, further comprising means for sequentially enabling and disabling said means for modifying synchronously with the rewriting of said video memory.

7. A still picture reproduction system for an information reproduction device having a video memory for storing video information obtained from a recorded disk, comprising: means for writing video information for at least one field from said recorded disk into said video memory in response to a still picture reproduction command; means for repeatedly reading out said written by said means for writing video information as still picture information; means for detecting a disk takeout command; means for detecting a command for starting a disk information reading operation; and means operating in response to said disk information reading operation for reading a then readable disk and for simultaneously effecting reading out said video information written by said means for writing.

8. A system as claimed in claim 7, further including output selecting means for selecting between an output of said video memory and video signal contemporaneously read from a disk.

9. A system as claimed in claim 8, wherein said means or detecting a command for starting a disk information reading operation controls said output selecting means to select output of said said video memory; and further comprising audio output means for reproducing audio information recorded on said then readable disk during reading out said video information written by said means for writing.

10. A still picture reproduction system for an information reproduction device having a video memory, comprising: means for writing video information for at least one field from an audio/video source into said video memory in response to a still picture reproduction command; means for repeatedly reading out said video information written into said video memory; and means for continuously reproducing audio information received from said audio/video source while repeatedly reading out said video information written by said means for writing.

11. A system as claimed in claim 10, wherein said audio/video source comprises a recorded disk, and wherein at least said audio information reproduced during repeated read out of said video memory is recorded on said recorded disk at locations thereon following the locations at which said video information written by said means for writing is recorded.

* * * * *